US012761477B2

(12) United States Patent
Lowney et al.

(10) Patent No.: US 12,761,477 B2
(45) Date of Patent: Oct. 13, 2026

(54) HIGH-RELIABILITY STACKED WAVEGUIDE WITH REDUCED SENSITIVITY TO PUPIL WALK

(71) Applicant: GOOGLE LLC, Mountain View, CA (US)

(72) Inventors: Joseph Daniel Lowney, Tucson, AZ (US); Ali Karbasi, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 557 days.

(21) Appl. No.: 18/137,397

(22) Filed: Apr. 20, 2023

(65) Prior Publication Data

US 2023/0341688 A1 Oct. 26, 2023

Related U.S. Application Data

(60) Provisional application No. 63/332,823, filed on Apr. 20, 2022.

(51) Int. Cl.
*G02B 27/01* (2006.01)
*G02B 27/00* (2006.01)

(52) U.S. Cl.
CPC ..... *G02B 27/0172* (2013.01); *G02B 27/0081* (2013.01); *G02B 2027/0178* (2013.01)

(58) Field of Classification Search
CPC ............ G02B 27/0172; G02B 27/0081; G02B 2027/0178
See application file for complete search history.

(56) References Cited

U.S. PATENT DOCUMENTS

2016/0116739 A1* 4/2016 TeKolste ................ G02B 6/005
2017/0212348 A1* 7/2017 Fu ...................... G02B 6/02052
2020/0400941 A1* 12/2020 Li ...................... G02B 27/4272
2020/0409145 A1* 12/2020 Bablumyan ........ G02B 27/0081
2021/0268756 A1* 9/2021 Melli ................. G02B 27/0172
2022/0299772 A1* 9/2022 Mills ...................... G02B 1/045

FOREIGN PATENT DOCUMENTS

WO WO-2021030908 A1 * 2/2021 ......... G02B 27/0172

OTHER PUBLICATIONS

Dong et al. "Compact double-grating coupler between vertically stacked silicon-on-insulator waveguides" Applied Optics, vol. 44, No. 35, pp. 7540-7547, 2005 (Year: 2005).*
Kress et al. "Waveguide combiners for mixed reality headsets: a nanophotonics design perspective" Nanophotonics 2021; 10(1): 41-74 (Year: 2020).*

* cited by examiner

*Primary Examiner* — George G. King

(57) ABSTRACT

A first waveguide of a stacked waveguide located closest to the eye of a user operates in a reflection mode such that the set of grating structures of the first waveguide are disposed on a surface of the first waveguide opposite the eye of the user and towards the interior of the stacked waveguide. Additionally, a second waveguide of the stacked waveguide located further from the eye of the user operates in a transmission mode such that the grating structures of the second waveguide are disposed on a surface of the second waveguide facing the eye of the user and facing the interior of the stacked waveguide.

20 Claims, 8 Drawing Sheets

HIGH-RELIABILITY STACKED WAVEGUIDE WITH REDUCED SENSITIVITY TO PUPIL WALK

CROSS-REFERENCE TO RELATED APPLICATIONS

The present application claims priority to U.S. Provisional Patent Application Ser. No. 63/332,823, entitled "HIGH-RELIABILITY STACKED WAVEGUIDE WITH REDUCED SENSITIVITY TO PUPIL WALK" and filed on Apr. 20, 2022, the entirety of which is incorporated by reference herein.

BACKGROUND

Waveguides, such as those used in head-worn displays (HWDs), commonly include grating structures disposed on the surfaces of the waveguides and configured to guide light provided from a projector to the eyes of a user. However, such grating structures are fragile and are easily damaged by scratching or particulate contamination introduced during fabrication or use of the HWD. Additionally, such grating structures are difficult to clean as contact with the grating structures may likely cause scratching or other damage. Further, to improve the field of view of an HWD, some HWDs include a stacked waveguide formed from two or more waveguides. Within these stacked waveguides, the waveguides forming the stacked waveguide are arranged such that there is a separation between the grating structures of the respective waveguides. Such a separation causes light exiting the stacked waveguide to be at different lateral angles for different viewing angles, degrading the display quality of the HWD and negatively impacting the user experience.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
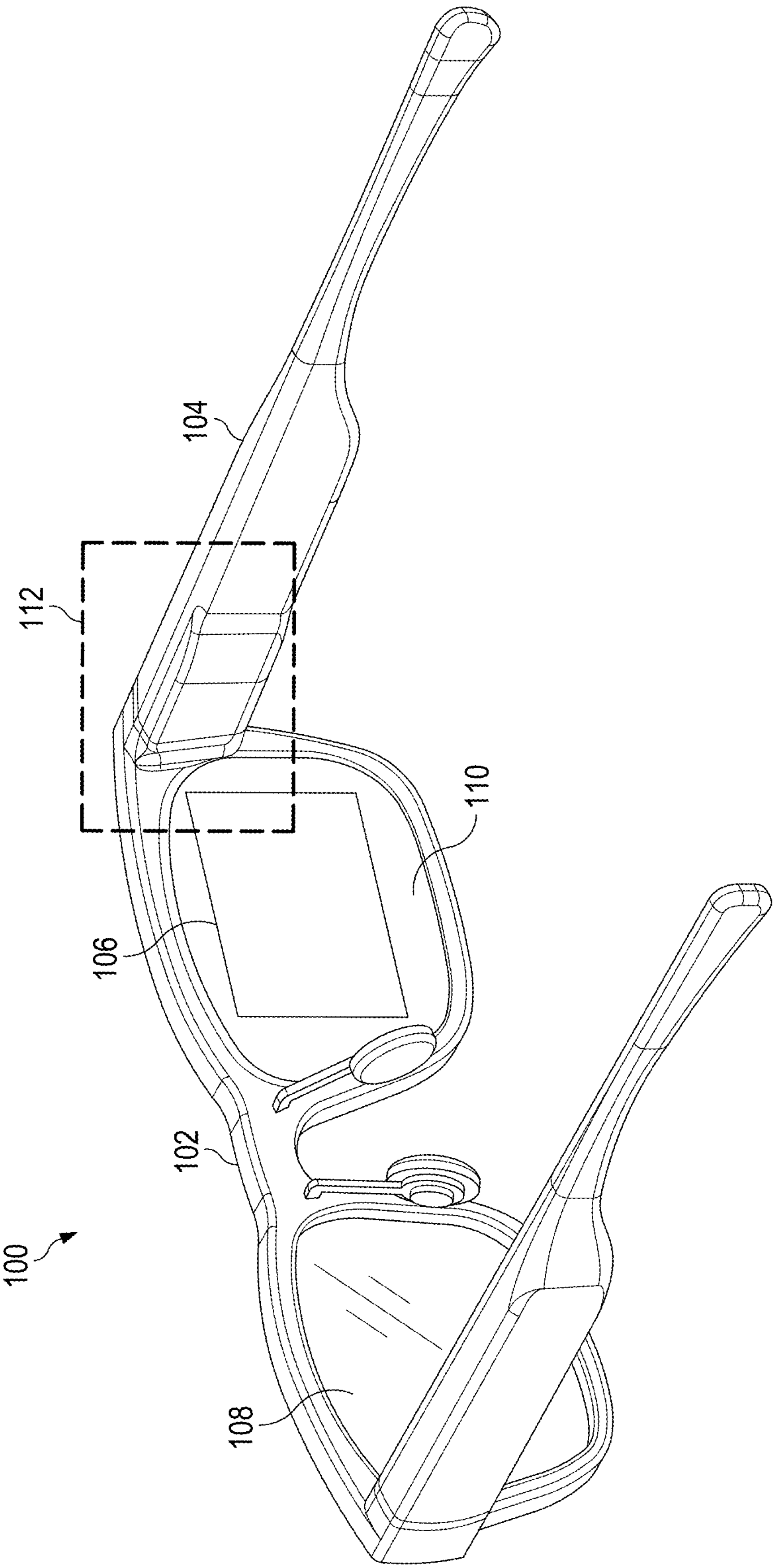
FIG. 1 is a diagram of an example display system housing a laser projector system configured to project images toward the eye of a user, in accordance with some embodiments.

Some head-worn displays (HWDs) (e.g., augmented reality head-worn displays) are designed to look like eyeglasses, with at least one of the lenses containing a waveguide to direct light to a user's eye. The combination of the lens and waveguide is referred to as an "optical combiner," "optical combiner lens," or both. Such waveguides form, for example, exit pupil expanders (EPEs) and outcouplers that form and guide light to the user's eye. The HWDs generally have a frame designed to be worn in front of a user's eyes to allow the user to view both their environment and computer-generated content projected from the combiner. Components that are necessary to the functioning of a typical HWDs, such as, for example, an optical engine to project computer-generated content (e.g., light representative of one or more images), cameras to pinpoint physical location, cameras to track the movement of the user's eye(s), processors to power the optical engine, and a power supply, are typically housed within the frame of the HWD. As an HWD frame has limited volume in which to accommodate these components, it is desirable that these components be as small as possible and configured to interact with the other components in very small volumes of space.

To accommodate larger fields of view or spectral bandwidth for a user, some HWDs include stacked waveguides that are formed from two or more waveguides. For example, some waveguides forming a stacked waveguide are each responsive to respective sets of wavelengths of light, allowing an HWD to accommodate a larger spectral bandwidth. Within a stacked waveguide, each waveguide includes respective grating structures configured to receive, diffract, and guide light received from an optical engine (e.g., projector) to the eye of a user such that the eyebox of the light is expanded when it is received at the eye of the user. However, a separation between the incoupler grating structures of the waveguides of a stacked waveguide introduces pupil walk in the stacked waveguide, where the exit pupil of light exiting the stacked waveguide is at different lateral angles for different viewing angles. To help reduce such pupil walk, the waveguides within a stacked waveguide are disposed such that the grating structures of each waveguide only face the interior of the stacked waveguide. For example, a first waveguide of a stacked waveguide located closest to the eye of a user includes grating structures (e.g., incoupler grating structures) disposed on a surface of the first waveguide opposite the eye of the user and towards the interior of the stacked waveguide. Additionally, a second waveguide of the stacked waveguide located further from the eye of the user includes grating structures (e.g., incoupler grating structures) disposed on a surface of the second waveguide facing the eye of the user and the interior of the stacked waveguide. In this way, the distance between the incoupler grating structures of the waveguides within the stacked waveguide is reduced, helping alleviate the effects of any pupil walk. Additionally, the grating structures are protected from damage and particulates from outside the stacked waveguide as the grating structures only face the interior of the stacked waveguide and are not exposed to elements outside the stacked waveguide.

FIG. 1 illustrates an example display system 100 having a support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 is a head-worn display (HWD) that includes a support structure 102 configured to be worn on the head of a user and has a general shape and appearance of an eyeglasses (e.g., sunglasses) frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth interface, a Wi-Fi interface, and the like. Further, in some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide an FOV of the user's real-world environment such that the image appears superimposed over at least a portion of the real-world environment.

In some embodiments, the projector is a digital light processing-based projector, a scanning laser projector, or any combination of a modulative light source such as a laser or one or more LEDs and a dynamic reflector mechanism such as one or more dynamic scanners or digital light processors. In some embodiments, the projector includes multiple laser diodes (e.g., a red laser diode, a green laser diode, and/or a blue laser diode) and at least one scan mirror (e.g., two one-dimensional scan mirrors, which may be MEMS-based or piezo-based). The projector is communicatively coupled to the controller and a non-transitory processor-readable storage medium or a memory that stores processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the projector routes light via first and second scan mirrors, a multi-pass optical relay disposed between the first and second scan mirrors, and a waveguide disposed at the output of the second scan mirror. In some embodiments, at least a portion of an outcoupler of the waveguide may overlap the FOV area 106. These aspects are described in greater detail below.

Figure 2:
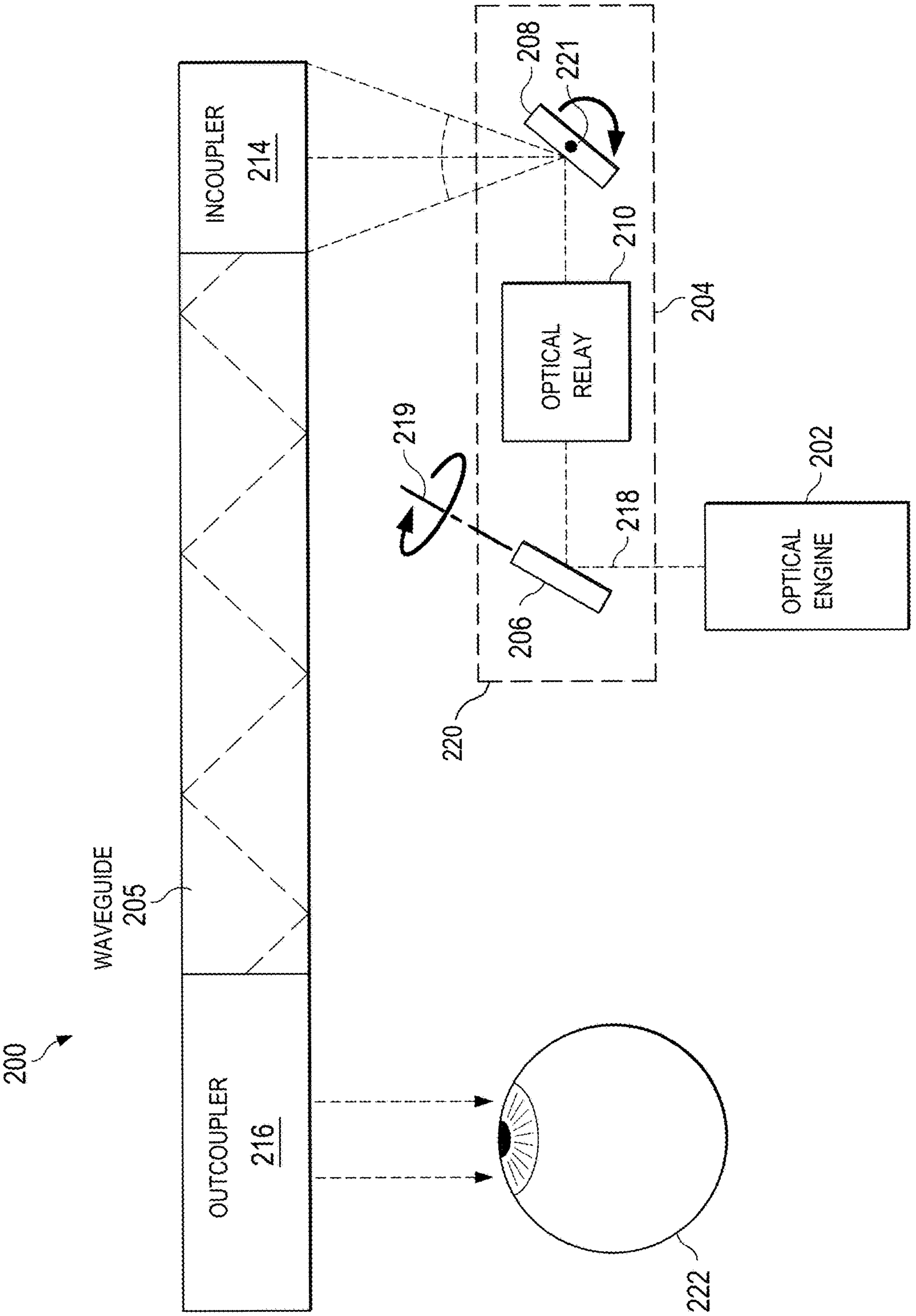
FIG. 2 is a diagram illustrating a laser projection system that projects images directly onto the eye of a user via laser light, in accordance with some embodiments.

FIG. 2 illustrates a simplified block diagram of a laser projection system 200 that projects images directly onto the eye of a user via laser light. The laser projection system 200 includes an optical engine 202, an optical scanner 204, and a waveguide 205. The optical scanner 204 includes a first scan mirror 206, a second scan mirror 208, and an optical relay 210. The waveguide 205 includes an incoupler 214 and an outcoupler 216, with the outcoupler 216 being optically aligned with an eye 222 of a user in the present example. In some embodiments, the laser projection system 200 is implemented in a wearable heads-up display or other display system, such as the display system 100 of FIG. 1.

The optical engine 202 includes one or more laser light sources configured to generate and output laser light 218 (e.g., visible laser light such as red, blue, and green laser light and/or non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 222 of a user.

For example, during the operation of the laser projection system 200, multiple laser light beams having respectively different wavelengths are output by the laser light sources of the optical engine 202, then combined via a beam combiner (not shown), before being directed to the eye 222 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of the scan mirrors 206 and 208 of the optical scanner 204 are MEMS mirrors in some embodiments. For example, the scan mirror 206 and the scan mirror 208 are MEMS mirrors that are driven by respective actuation voltages to oscillate during active operation of the laser projection system 200, causing the scan mirrors 206 and 208 to scan the laser light 218. Oscillation of the scan mirror 206 causes laser light 218 output by the optical engine 202 to be scanned through the optical relay 210 and across a surface of the second scan mirror 208. The second scan mirror 208 scans the laser light 218 received from the scan mirror 206 toward an incoupler 214 of the waveguide 205. In some embodiments, the scan mirror 206 oscillates along a first scanning axis 219, such that the laser light 218 is scanned in only one dimension (e.g., in a line) across the surface of the second scan mirror 208. In some embodiments, the scan mirror 208 oscillates or otherwise rotates along a second scanning axis 221. In some embodiments, the first scanning axis 219 is perpendicular to the second scanning axis 221.

In some embodiments, the incoupler 214 has a substantially rectangular, circular, or elliptical profile and is configured to receive the laser light 218 and direct the laser light 218 into the waveguide 205. The incoupler 214 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 214), routes the laser light 218 to the second scan mirror 208, and introduces a convergence to the laser light 218 in the first dimension to an exit pupil beyond the second scan mirror 208. Herein, an "exit pupil" in an optical system refers to the location along the optical path where beams of light intersect. For example, the possible optical paths of the laser light 218, following reflection by the first scan mirror 206, are initially spread along the first scanning axis, but later these paths intersect at an exit pupil beyond the second scan mirror 208 due to convergence introduced by the optical relay 210. For example, the width (i.e., smallest dimension) of a given exit pupil approximately corresponds to the diameter of the laser light corresponding to that exit pupil. Accordingly, the exit pupil can be considered a "virtual aperture". According to various embodiments, the optical relay 210 includes one or more collimation lenses that shape and focus the laser light 218 on the second scan mirror 208 or includes a molded reflective relay that includes two or more spherical, aspheric, parabolic, and/or freeform lenses that shape and direct the laser light 218 onto the second scan mirror 208. The second scan mirror 208 receives the laser light 218 and scans the laser light 218 in a second dimension, the second dimension corresponding to the long dimension of the incoupler 214 of the waveguide 205. In some embodiments, the second scan mirror 208 causes the exit pupil of the laser light 218 to be swept along a line along the second dimension. In some embodiments, the incoupler 214 is positioned at or near the swept line downstream from the second scan mirror 208 such that the second scan mirror 208 scans the laser light 218 as a line or row over the incoupler 214.

In some embodiments, the optical engine 202 includes an edge-emitting laser (EEL) that emits a laser light 218 having a substantially elliptical, non-circular cross-section, and the optical relay 210 magnifies or minimizes the laser light 218 along its semi-major or semi-minor axis to circularize the laser light 218 prior to the convergence of the laser light 218 on the second scan mirror 208. In some such embodiments, a surface of a mirror plate of the scan mirror 206 is elliptical and non-circular (e.g., similar in shape and size to the cross-sectional area of the laser light 218). In other such embodiments, the surface of the mirror plate of the scan mirror 206 is circular.

The waveguide 205 of the laser projection system 200 includes the incoupler 214 and the outcoupler 216. The term "waveguide," as used herein, will be understood to mean a combiner using one or more of total internal reflection (TIR), partial internal reflection (PIR), specialized filters, and/or reflective surfaces, to transfer light from an incoupler (such as the incoupler 214) to an outcoupler (such as the outcoupler 216). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, and/or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 214 is relayed to the outcoupler 216 via the waveguide 205 using TIR. The laser light 218 is then output to the eye 222 of a user via the outcoupler 216. As described above, in some embodiments the waveguide 205 is implemented as part of an eyeglass lens, such as the lens element 108 or lens element 110 (FIG. 1) of the display system having an eyeglass form factor and employing the laser projection system 200.

Although not shown in the example of FIG. 2, in some embodiments additional optical components are included in any of the optical paths between the optical engine 202 and the scan mirror 206, between the scan mirror 206 and the optical relay 210, between the optical relay 210 and the scan mirror 208, between the scan mirror 208 and the incoupler 214, between the incoupler 214 and the outcoupler 216, and/or between the outcoupler 216 and the eye 222 (e.g., in order to shape the laser light for viewing by the eye 222 of the user). In some embodiments, a prism is used to steer light from the scan mirror 208 into the incoupler 214 so that light is coupled into incoupler 214 at the appropriate angle to encourage the propagation of the light in waveguide 205 by TIR. Also, in some embodiments, an exit pupil expander (e.g., an exit pupil expander 324 of FIG. 3, described below), such as a fold grating, is arranged in an intermediate stage between incoupler 214 and outcoupler 216 to receive light that is coupled into waveguide 205 by the incoupler 214, expand the light, and redirect the light towards the outcoupler 216, where the outcoupler 216 then couples the laser light out of waveguide 205 (e.g., toward the eye 222 of the user).

Figure 3:
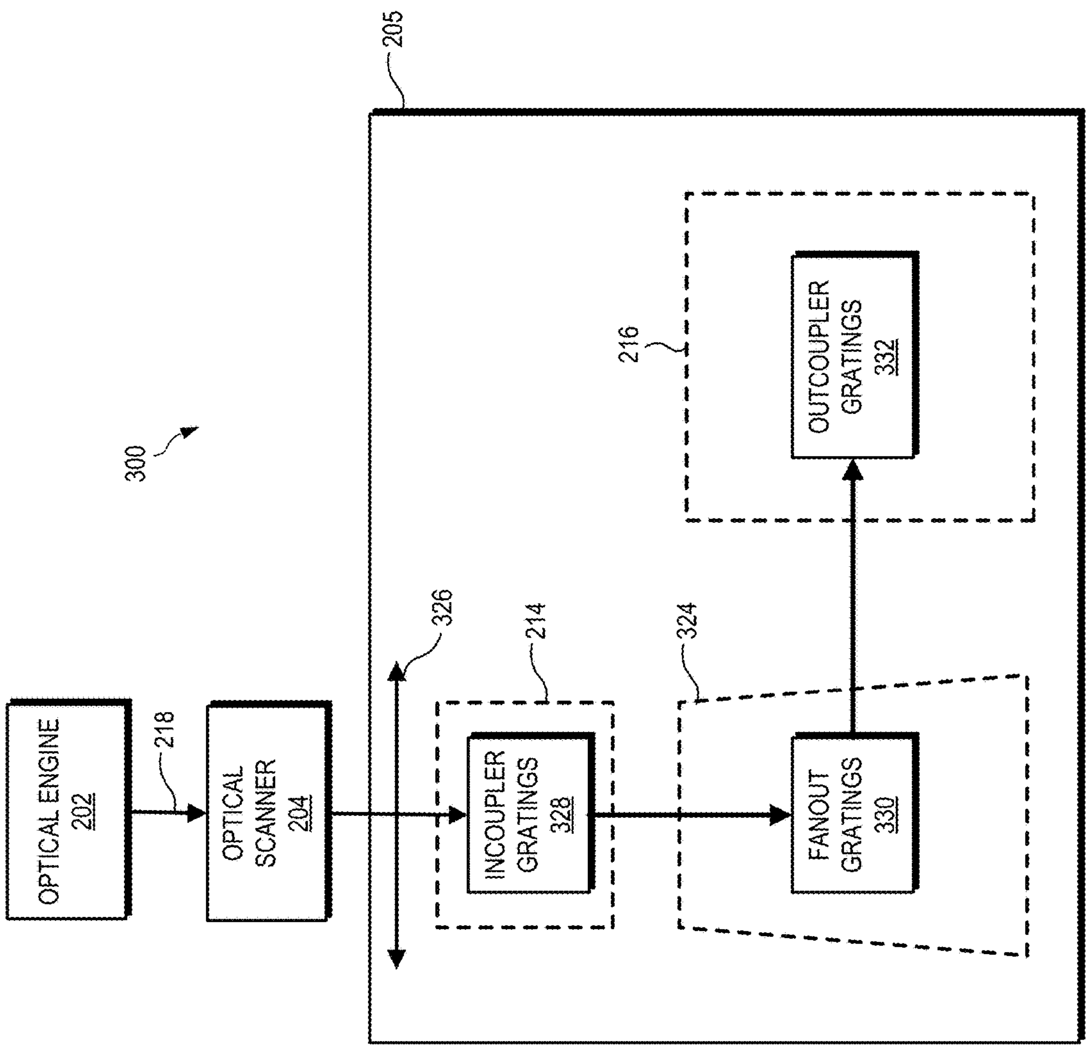
FIG. 3 is a diagram illustrating an example waveguide exit pupil expansion system, in accordance with embodiments.

FIG. 3 illustrates a waveguide exit pupil expansion system 300, according to embodiments. In embodiments, waveguide exit pupil expansion system 300 is implemented in, for example, display system 100 and is configured to provide an image to an eye 222 of a user an HWD. To this end, waveguide pupil expansion system 300 includes optical engine 202, optical scanner 204, and waveguide 205. According to embodiments, optical engine 202 is configured to project laser light 218 (e.g., white light, green light, red light, blue light, infrared light, ultraviolet light, or any combination thereof) towards optical scanner 204. In response to receiving laser light 218, optical scanner 204 is configured to scan laser light 218 along at least a first scanning axis 326, for example, by using one or more scan mirror 206, 208 each configured to oscillate about a respective axis 219, 221. Optical scanner 204 is then configured to provide laser light 218 as scanned along at least a first scanning axis 326 to incoupler 214 of waveguide 205.

After receiving laser light 218, incoupler 214 is configured to guide laser light 218 from incoupler 214 to exit pupil expander (EPE) 324 via at least a portion of waveguide 205. For example, incoupler 214 guides laser light 218 from incoupler 214 such that laser light 218 propagates through at least a portion of waveguide 205 via TIR, PIR, or both and is received at EPE 324. To this end, incoupler 214 includes one or more incoupler gratings 328 each configured to diffract laser light 218 in one or more directions into a portion of waveguide 205. Such incoupler gratings 328, for example, include one or more grating structures (e.g., Bragg grating structures, surface-relief grating structures, polarization volume grating structures, volumetric holographic grating structures) disposed on a surface of waveguide 205 and configured to diffract received light based on the angle of the grating structures, the material of the grating structures, or both into at least a portion of waveguide 205. In response to receiving laser light 218 from incoupler 214 (e.g., via at least a portion of waveguide 205), EPE 324 is configured to expand the eyebox of the display represented by laser light 218. For example, EPE 324 is configured to diffract laser light 218 such that the exit pupil of laser light 218 is enlarged (e.g., expanded).

To expand the exit pupil of laser light 218, EPE 324 includes one or more fanout gratings 330 that are configured to diffract received light so as to increase the size of the exit pupil of the light (e.g., expand the exit pupil of the light). Such fanout gratings 330, for example, include one or more grating structures (e.g., Bragg grating structures, surface-relief grating structures, polarization volume grating structures, volumetric holographic grating structures) configured to diffract light received according to the angle of the grating structures, the material of the grating structures, or both such that the exit pupil of the light is expanded. According to embodiments, EPE 324 provides laser light 218 with the expanded exit pupil to at least a second portion of waveguide 205 configured to propagate laser light 218 (e.g., via TIR, PIR) toward outcoupler 216. For example, fanout gratings 330 are configured to diffract received laser light 218 such that the exit pupil of laser light 218 is expanded and laser light 218 is provided to outcoupler 216 via at least a second portion of waveguide 205. Outcoupler 216 is configured to direct received laser light 218 out of waveguide 205 and towards the eye 222 of a user. To this end, outcoupler 216 includes one or more outcoupler gratings 332 configured to diffract received laser light 218 out of waveguide 205. Outcoupler gratings 332 includes, for example, one or more grating structures (e.g., Bragg grating structures, surface-relief grating structures, polarization volume grating structures, volumetric holographic grating structures) configured to diffract light based on the angle of the grating structures, the material of the grating structures, or both such that the light is directed out of waveguide 205 and toward the eye 222 of a user.

Figure 4:
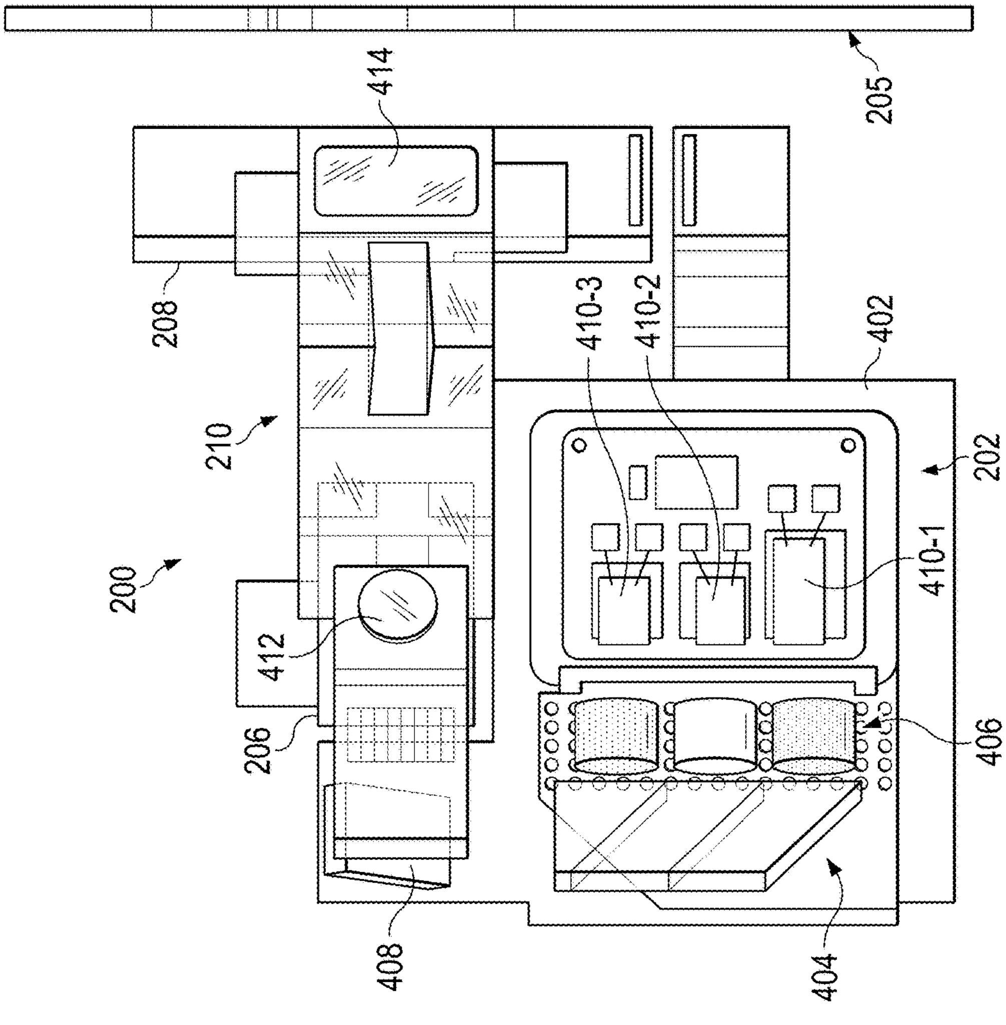
FIG. 4 is a diagram illustrating an example laser projection system having an optical relay including a molded reflective relay, in accordance with some embodiments.

FIG. 4 shows an example embodiment of the laser projection system 200 in which the optical relay 210 includes a molded reflective relay. As shown, the laser projection system 200 includes a substrate 402 on which a beam combiner 404, primary lenses 406, and a mirror 408 are disposed. According to various embodiments, the substrate 402 is a printed circuit board (PCB) or otherwise another applicable substrate.

The optical engine 202 comprises a set of one or more laser light sources 410 (e.g., laser diodes), such as the illustrated red laser light source 410-1, green laser light source 410-2, and blue laser light source 410-3, wherein a processor or other controller operates the optical engine 202 to modulate the respective intensity of each laser light source 410 so as to provide a corresponding red light, green light, and blue light contribution to a corresponding pixel of an image being generated for display to the user. The primary lenses 406 includes a corresponding number of collimation lenses (e.g., three for the three laser light sources 410 in the example above), each interposed in the light path between a respective laser light source 410 of the optical engine 202 and the beam combiner 404. For example, each laser light source 410 outputs a different wavelength of laser light (e.g., corresponding to respective red, blue, and green wavelengths) through the primary lenses 406 to be combined at the beam combiner 404 to produce the laser light (i.e., laser light 218 shown in FIG. 2) to be projected by the laser projection system 200. The beam combiner 404 receives the individual laser light inputs and outputs a combined laser light 218 to the mirror 408, which redirects the laser light 218 onto a reflective surface 412 of the scan mirror 206. The scan mirror 206 scans the laser light 218 into the optical relay 210 across a first scanning axis.

In the example of FIG. 4, the optical relay 210 is a molded reflective relay, which may be, for example, molded from a solid clear component (e.g., glass or an optical plastic such as Zeonex) and the reflective surfaces thereof are implemented as mirror coatings or metasurfaces. Such molding can simplify the fabrication of the laser projection system 200 as it facilitates the incorporation of some or all of the optical surfaces of the relay into a single element, rather than several distinct, separate elements.

The optical relay 210 is configured to route the laser light 218 toward a reflective surface 414 of the scan mirror 208. The scan mirror 208 scans the laser light 218 across the incoupler (such as the incoupler 214) of the waveguide 205 along a second scanning axis that is perpendicular to the first scanning axis.

Figure 5:
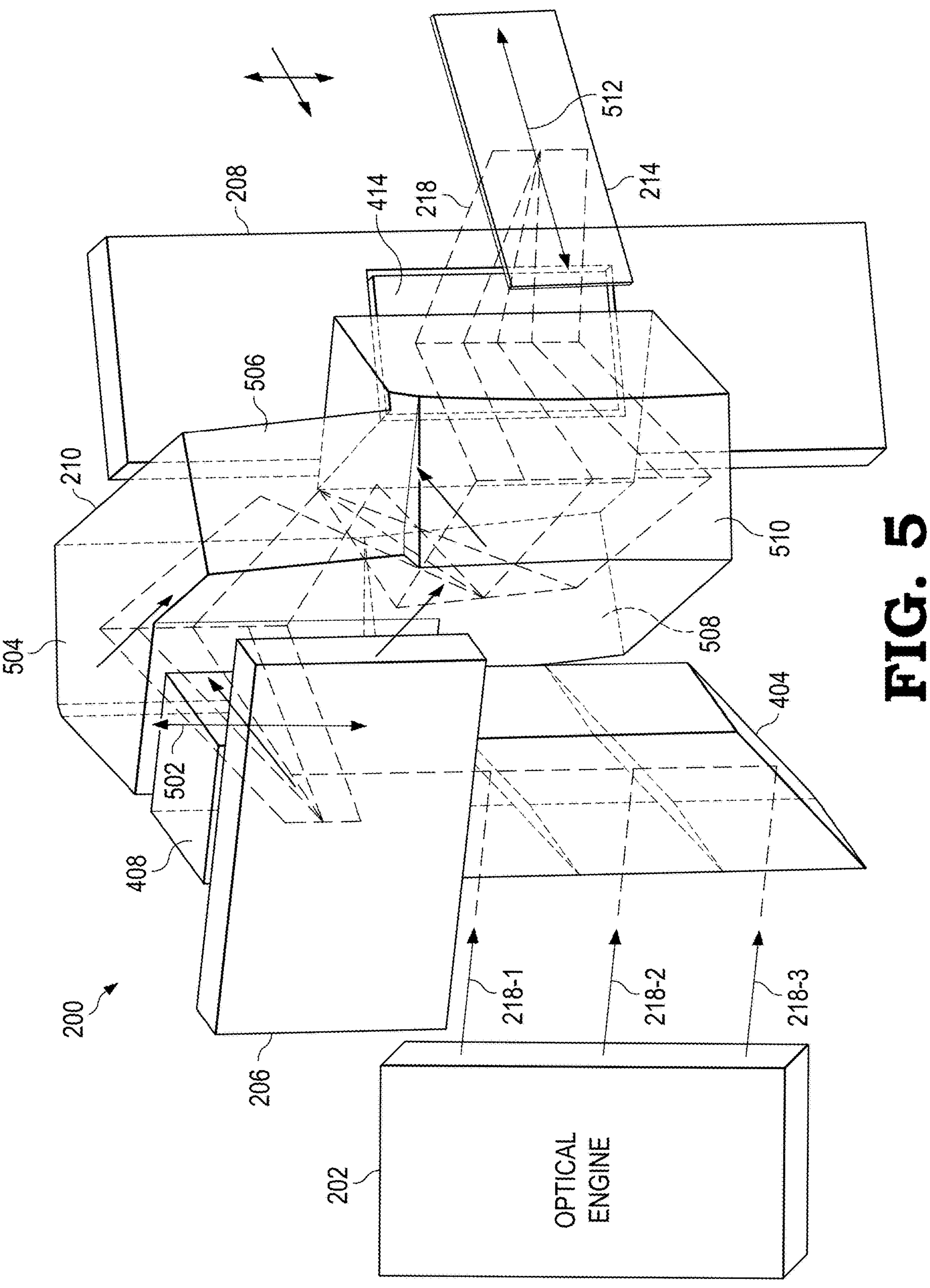
FIG. 5 is a diagram illustrating example paths that concurrent laser lights take through an optical relay, in accordance with some embodiments.

FIG. 5 shows an example of paths that the concurrent laser lights output by the optical engine 202 can take through the optical relay 210 for an embodiment in which the optical relay 210 is a molded reflective relay. As shown, the optical engine 202 outputs red laser light 218-1, green laser light 218-2, and blue laser light 218-3 toward the beam combiner 404. The beam combiner 404 combines individual beams of the laser light 218-1, 218-2, 218-3 into the laser light 218, and redirects the laser light 218 toward the mirror 408, which reflects the laser light 218 onto the scan mirror 206. The scan mirror 206 scans the laser light 218 along a first scanning axis 502 into the optical relay 210. The optical relay 210 reflects the laser light 218 off of reflective surfaces 504, 506, 508, and 510, then outputs the laser light 218 toward the reflective surface 414 of the scan mirror 208. The scan mirror 208 then scans the laser light 218 across the incoupler 214 along a second scanning axis 512, where the laser light 218 converges onto the incoupler 214 at most or all achievable scan angles of the scan mirror 206.

Figure 6:
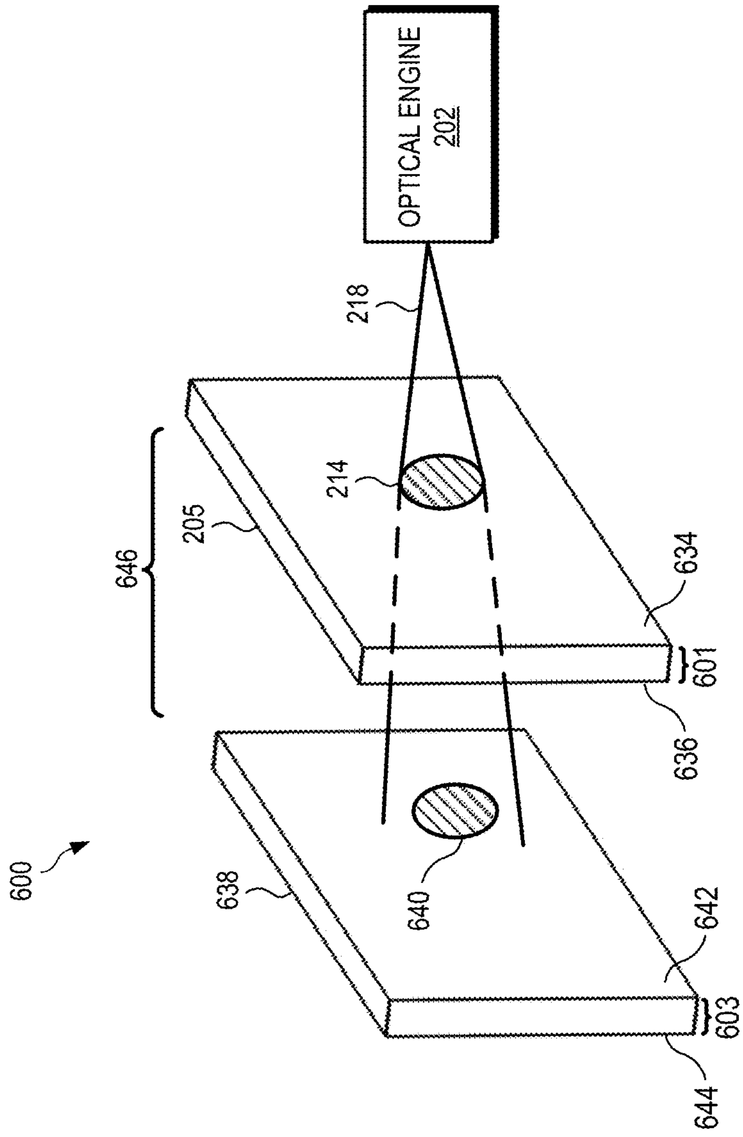
FIG. 6 is a diagram illustrating a stacked waveguide, in accordance with some embodiments.

Referring now to FIG. 6, a stacked waveguide 600 is presented. According to embodiments, the stacked waveguide 600 is implemented in, for example, display system 100 and is configured to provide an image to an eye 222 of a user an HWD. Such a stacked waveguide 600, for example, is configured to increase the FOV of an image represented by laser light 218 projected from optical engine 202, provide one or more colors of laser light 218 to an eye 222 of a user, or both. To this end, the stacked waveguide 600 includes two or more waveguides separated by a gap 646 representing, for example, a distance between the waveguides. As an example, the stacked waveguide 600 includes a first waveguide (e.g., waveguide 205) having a first surface 634, a second, opposite surface 636, and a thickness 601 between the surfaces 634, 636. Further, the stacked waveguide 600, for example, includes a second waveguide 638, similar to or the same as waveguide 205, having a first surface 642, second, opposing surface 644, and a thickness

603 between the surfaces 642, 644. The first waveguide 205 and the second waveguide 638 are disposed such that there is a gap 646 between the second surface 636 of the first waveguide 205 and the first surface 642 of the second waveguide 638.

In embodiments, the first waveguide 205 includes a first incoupler 214 that includes one or more incoupler gratings (e.g. incoupler gratings 328) disposed on the first surface 634 of the first waveguide 205 and the second waveguide 638 includes a second incoupler 640, similar to or the same as incoupler 214, that also includes one or more incoupler gratings (e.g. incoupler gratings 328) disposed on the first surface 642 of the second waveguide 638. According to embodiments, within stacked waveguide 600, the first incoupler 214 and the second incoupler 640 are each disposed such that they are separated by a distance equal to gap 646 plus the thickness 601 of the first waveguide 205. To provide laser light 218 to each waveguide within stacked waveguide 600, optical engine 202 is configured to emit laser light 218 such that laser light 218 is received at the first incoupler 214, passes through at least a portion of waveguide 205, and is then received at the second incoupler 640. As an example, in some embodiments, optical engine 202 emits laser light 218 toward optical scanner 220 which is configured to scan laser light 218 along at least one scanning axis 326 and provide the scanned laser light 218 to the first incoupler 214. According to embodiments, optical scanner 204 is configured to scan laser light 218 at least one scanning axis 326 such that the laser light 218 received at the first outcoupler 216 is similar in size and shape to first outcoupler 216. After being received by the first incoupler 214, laser light 218 then travels through waveguide 205 and is received at the second incoupler 640. However, due to the distance (e.g., gap 646 plus thickness 601) between incoupler 214 and incoupler 640, in some embodiments, the laser light 218 received at the second incoupler 640 has a greater size, different shape, or both from the second incoupler 640. Because laser light 218 received at the second incoupler 640 has a greater size, different shape, or both from the second incoupler 640, the exit pupil of the light provided from the second waveguide 638 to the eye 222 of a user is, in some embodiments, at different lateral angles for different view angles (e.g., experiencing pupil walk) for the user, degrading the quality of the image displayed by stacked waveguide 600.

Figure 7:
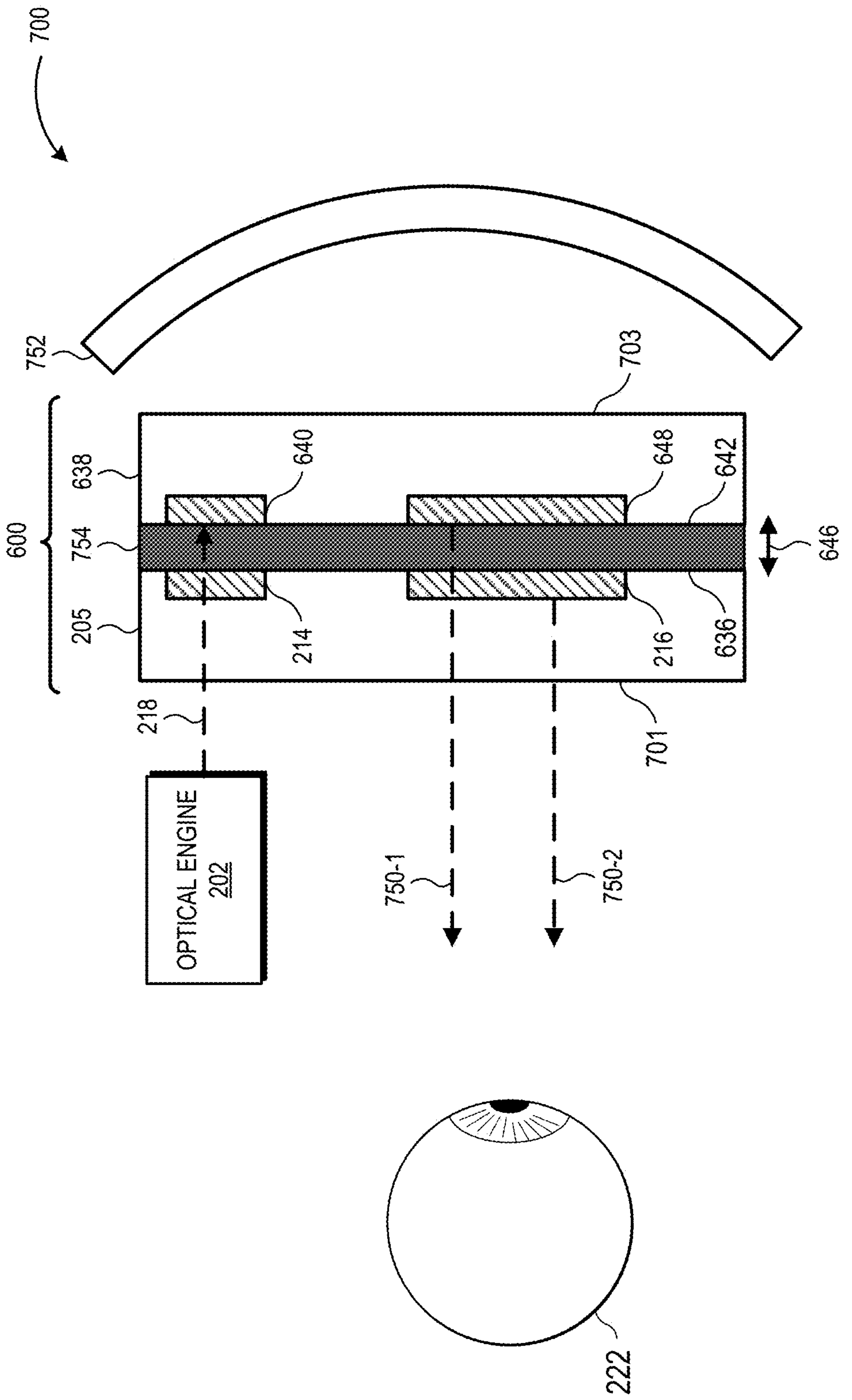
FIG. 7 is a diagram illustrating a stacked waveguide architecture for reducing pupil walk, in accordance with some embodiments, in accordance with some embodiments.

To help alleviate such pupil walk from a stacked waveguide, FIG. 7 presents a stacked waveguide architecture 700. According to embodiments, stacked waveguide architecture 700 is implemented in display system 100 along with lens 752 (e.g., lens elements 108, 110). Stacked waveguide architecture 700 includes a stacked waveguide 600 disposed between the eye 222 of a user and a lens 752. Further, the stacked waveguide 600 is formed from two waveguides 205, 638 separated by gap 646 and has a first surface 701 (e.g., user-facing surface) that faces the eye 222 of the user and a second surface 703 (e.g., world-facing surface) that faces lens 752. According to embodiments, the first waveguide 205 that partly forms stacked waveguide 600 includes incoupler 214 which includes one or more incoupler gratings (e.g., incoupler gratings 328) disposed on a surface of the first waveguide 205. Additionally, in embodiments, the first waveguide 205 includes an EPE (not shown for clarity) which includes one or more fanout gratings (e.g., fanout gratings 330), outcoupler 216 which includes one or more outcoupler gratings (e.g., outcoupler gratings 332), or both disposed a surface of the first waveguide 205 (e.g., the same surface on which the incoupler gratings are disposed). For example, in some embodiments, the first waveguide 205 operates in a reflection mode by having the incoupler gratings of incoupler 214, fanout gratings of an EPE, and the outcoupler gratings of outcoupler 216 disposed on the surface 636 of the first waveguide 205 facing away from the eye 222 of the user (e.g., toward lens 752). Similarly, the second waveguide 638 that partly forms stacked waveguide 600 includes incoupler 640 which includes one or more incoupler gratings (e.g., incoupler gratings 328) disposed on a surface of the first waveguide 205, an EPE (not shown for clarity) that includes one or more fanout gratings (e.g., fanout gratings 330) disposed on a surface of the first waveguide 205 (e.g., the same surface as the incoupler gratings), and outcoupler 648 which includes one or more outcoupler gratings (e.g., outcoupler gratings 332) disposed on a surface of the first waveguide (e.g., the same surface as the incoupler gratings). As an example, in some embodiments, the second waveguide 638 operates in a transmission mode by having the incoupler gratings of incoupler 640, fanout gratings of an EPE, and the outcoupler gratings of outcoupler 648 disposed on the surface 642 of the second waveguide 205 facing toward from the eye 222 of the user (e.g., toward lens 752).

According to some embodiments, the first waveguide 205, the second waveguide 638, or both are each associated with one or more respective wavelengths of light such that the first waveguide 205, the second waveguide 638, or both are configured to provide only their associated wavelengths to the eye 222 of a user. As an example, the first waveguide 205 is configured to provide wavelengths associated with blue light and green light to the eye 222 of user. To this end, in embodiments, optical engine 202 is configured to provide laser light 218 to the incoupler 214 of the first waveguide 205. In response to receiving laser light 218, the incoupler 214 provides at least a portion of laser light 218 (e.g., a portion of laser light 218 having wavelengths associated with blue light, green light, or both) to an EPE, outcoupler 216, or both of the first waveguide 205. After receiving the at least a portion of laser light 218 (e.g., a portion of laser light 218 having wavelengths associated with blue light, green light, or both), the outcoupler 216 of the first waveguide 205 provides the at least a portion of laser light 218 to the eye 222 of a user as output light 750-1 which includes, for example, wavelengths associated with blue light and green light. As another example, the second waveguide 638 is configured to provide wavelengths associated with red light to the eye 222 of user. To this end, in embodiments, optical engine 202 is configured to provide laser light 218 to the incoupler 640 of the second waveguide 638 (e.g., by passing laser light 218 through the first waveguide 205). In response to receiving laser light 218, the incoupler 640 provides at least a second portion of laser light 218 (e.g., a portion of laser light 218 having wavelengths associated with red light) to an EPE, outcoupler 648, or both of the second waveguide 638. After receiving the at least a second portion of laser light 218 (e.g., a portion of laser light 218 having wavelengths associated with red light), the outcoupler 648 of the second waveguide 638 provides the at least a second portion of laser light 218 to the eye 222 of a user as output light 750-2 which includes, for example, wavelengths associated with red light. By having each waveguide 205, 638 associated with respective wavelengths of light, stacked waveguide 600 is configured to accommodate a greater number of colors of light (e.g., spectral bandwidth) to provide to the eye 222 of a user.

In embodiments, the incoupler gratings, fanout gratings, outcoupler gratings, or any combination thereof of the first waveguide 205 are disposed on a surface of the first waveguide 205 that faces the surface of the second waveguide 638 on which the incoupler gratings, fanout gratings, outcoupler gratings, or any combination thereof of the second waveguide 638 are deposed. That is to say, the incoupler gratings, fanout gratings, outcoupler gratings, or any combination thereof of the first waveguide 205 face the incoupler gratings, fanout gratings, outcoupler gratings, or any combination thereof of the second waveguide 638 such that the gratings of both waveguides 205, 638 face the interior of stacked waveguide 600. As an example, as presented in FIG. 7, the incoupler gratings, outcoupler gratings, or both of the first waveguide 205 are disposed on a first surface 636 facing (e.g., adjacent to) a first surface 642 of the second waveguide 638 (e.g., an interior of the stacked waveguide 600). Further, the incoupler gratings, outcoupler gratings, or both of the second waveguide 638 are disposed on the first surface 642 facing (e.g., adjacent to) the first surface 636 of the first waveguide 205 (e.g., the interior of the stacked waveguide). In this way, the gratings of the stacked waveguide 600 (e.g., the gratings of the waveguides 205, 638) are better protected against scratches and other damage. For example, because the gratings of the waveguides 205, 638 face the interior of the stacked waveguide 600 rather than face outward from the stacked waveguide 600, the gratings are less likely to encounter external objects that may scratch or damage the gratings. In embodiments, to further help protect the gratings, stacked waveguide 600 includes a seal 754 configured to seal the grating structures disposed on the surfaces of the first and second waveguides 205, 638 inside the interior of stacked waveguide 600 (e.g., seal the gratings within gap 646 between the first waveguide 205 and the second waveguide 638). Such a seal 754, for example, is mold injected between the waveguides 205, 638, deposited on one or more surfaces of the waveguides 205, 638 (e.g., the surfaces on which the gratings are deposited), or both. Additionally, seal 754 includes glue, tape, rubber, glass, plastic, or any combination thereof configured to seal the gratings within the interior of the stacked waveguide 600. By using seal 754 to seal the gratings of the waveguides 205, 638 within the interior of the stacked waveguide 600, the gratings are less likely to be exposed to damage, dirt, and dust from outside the stacked waveguide 600.

Further, having the incoupler gratings of the first waveguide 205 face the incoupler gratings of the second waveguide 638 helps reduce pupil walk within the stacked waveguide 600. For example, in embodiments, optical engine 202 is configured to emit laser light 218 towards stacked waveguide 600 such that laser light 218 is first received by incoupler 214 of the first waveguide 205. According to some embodiments, optical scanner 204 first scans laser light 218 along one or more scanning axes such that laser light 218 has a similar size and shape as incoupler 214. After laser light 218 is received by incoupler 214, laser light 218 passes through gap 646, seal 754, or both and is received by incoupler 640. Because laser light 218 only passes through gap 646, seal 754, or both rather than passing through gap 646 and a thickness 603 of the second waveguide 638, the distance laser light 218 travels between incoupler 214 and incoupler 640 is reduced. By reducing the distance laser light 218 travels before it is received by incoupler 640, the laser light 218 is closer in size and shape to incoupler 640 when it is received at incoupler 640, which helps reduce pupil walk in the stacked waveguide 600 and helps prevent degradation of the image displayed to the eye 222 of the user.

Figure 8:
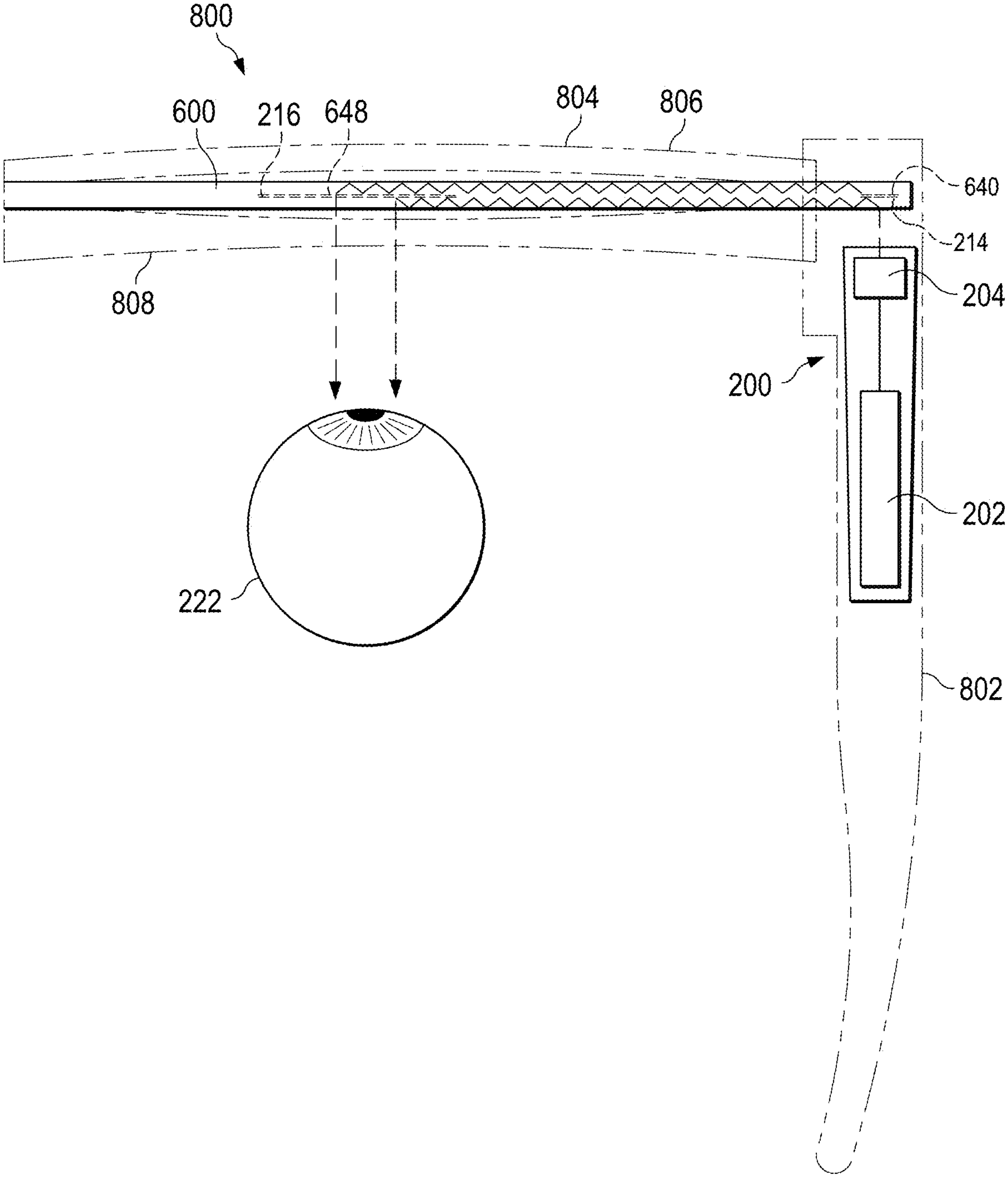
FIG. 8 is a diagram illustrating a partially transparent view of a head-worn display (HWD) that includes a laser projection system, in accordance with some embodiments.

FIG. 8 illustrates a portion of an HMD 800 that includes stacked waveguide 600. In some embodiments, the HMD 800 represents the display system 100 of FIG. 1. The optical engine 202, optical scanner 204, and a portion of the stacked waveguide 600 with incouplers 214, 640 are included in an arm 802 of the HMD 800, in the present example.

The HMD 800 includes an optical combiner lens 804, which includes a first lens 806, a second lens 808, and the stacked waveguide 600, with the stacked waveguide 600 disposed between the first lens 806 and the second lens 808. Light exiting through the outcouplers 216, 648 travels through the second lens 808 (which corresponds to, for example, the lens element 110 of the display system 100). In use, the light exiting second lens 808 enters the pupil of an eye 222 of a user wearing the HMD 800, causing the user to perceive a displayed image carried by the laser light output by the optical engine 202.

According to embodiments, the optical combiner lens 804 is substantially transparent, such that light from real-world scenes corresponding to the environment around the HMD 800 passes through the first lens 806, the second lens 808, and the stacked waveguide 600 to the eye 222 of the user. In this way, images or other graphical content output by the laser projection system 200 are combined (e.g., overlayed) with real-world images of the user's environment when projected onto the eye 222 of the user to provide an AR experience to the user.

Although not shown in the depicted example, in some embodiments additional optical elements are included in any of the optical paths between the optical engine 202 and the incouplers 214, 640, in between the incouplers 214, 640 and the outcouplers 216, 648 and/or in between the outcouplers 216, 648 and the eye 222 of the user (e.g., in order to shape the laser light for viewing by the eye 222 of the user). As an example, a prism is used to steer light from the optical scanner 204 into the incouplers 214, 640 so that light is coupled into incouplers 214, 640 at the appropriate angle to encourage propagation of the light in stacked waveguide 600 by TIR. Also, in some embodiments, one or more exit pupil expanders (e.g., the EPE 324) including, for example, fanout gratings 330 are arranged in an intermediate stage between incouplers 214, 640 and outcouplers 216, 648, respectively, to receive light that is coupled into stacked waveguide 600 by the incouplers 214, 640, expand the light, and redirect the light towards the outcouplers 216, 648, respectively where the outcouplers 216, 648 then couple the laser light out of the stacked waveguide 600 (e.g., toward the eye 222 of the user).

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A stacked waveguide, comprising:

a first waveguide including a first set of grating structures disposed on a first surface of the first waveguide facing an interior of the stacked waveguide, the first set of grating structures forming a first incoupler configured to direct a first portion of received light into a body of the first waveguide so as to be guided by total internal reflection inside the body of the first waveguide;

a first surface of the stacked waveguide formed from a second surface of the first waveguide opposite the first surface of the first waveguide;

a second waveguide including a second set of grating structures disposed on a first surface of the second waveguide facing the interior of the stacked waveguide and the first surface of the first waveguide, the second set of grating structures forming a second incoupler configured to direct a second portion of received light into a body of the second waveguide so as to be guided by total internal reflection inside the body of the second waveguide; and a second surface of the stacked waveguide formed from a second surface of the second waveguide opposite the first surface of the second waveguide, the second surface of the stacked waveguide opposite the first surface of the stacked waveguide.

2. The stacked waveguide of claim 1, wherein the first portion of received light includes wavelengths associated with a red color.

3. The stacked waveguide of claim 1, wherein the first waveguide further includes outcoupler gratings disposed on the first surface of the first waveguide.

4. The stacked waveguide of claim 3, wherein the second waveguide further includes outcoupler gratings disposed on the first surface of the second waveguide.

5. The stacked waveguide of claim 1, further comprising:

a seal configured to seal the first set of grating structures and the second set of grating structures in the interior of the stacked waveguide.

6. The stacked waveguide of claim 1, wherein the first waveguide is configured to direct light having a first set of wavelengths.

7. The stacked waveguide of claim 6, wherein the second waveguide is configured to direct light having a second set of wavelengths of light, the second set of wavelengths different from the first set of wavelengths.

8. The stacked waveguide of claim 1, wherein the second portion of received light includes wavelengths associated with a green color and a blue color.

9. The stacked waveguide of claim 8, wherein the stacked waveguide is configured to provide the first portion of light and the second portion of light to an eye of a user.

10. A wearable display, comprising:

an optical engine; and a stacked waveguide comprising:

a first waveguide including a first set of incoupler gratings disposed on a first surface of the first waveguide, the first set of incoupler gratings configured to direct a first portion of light emitted by the optical engine into a body of the first waveguide so as to be guided by total internal reflection inside the body of the first waveguide;

a first surface of the stacked waveguide formed from a second surface of the first waveguide opposite the first surface of the first waveguide;

a second waveguide including a second set of incoupler gratings on a first surface of the second waveguide facing the first surface of the first waveguide, the second set of incoupler gratings configured to direct a second portion of light emitted by the optical engine into a body of the second waveguide so as to be guided by total internal reflection inside the body of the second waveguide; and a second surface of the stacked waveguide formed from a second surface of the second waveguide opposite the first surface of the second waveguide, the second surface of the stacked waveguide opposite the first surface of the stacked waveguide.

11. The wearable display of claim 10, wherein the first portion of light emitted by the optical engine includes light having a first set of wavelengths and the second portion of light emitted by the optical engine includes light having a second set of wavelengths, the second set of wavelengths different from the first set of wavelengths.

12. The wearable display of claim 10, wherein the first waveguide further comprises outcoupler gratings disposed on the first surface of the first waveguide and configured to direct the first portion of the light out of the body of the first waveguide.

13. The wearable display of claim 12, wherein the second waveguide further includes outcoupler gratings disposed on the first surface of the second waveguide and configured to direct the second portion of the light out of the second waveguide.

14. The wearable display of claim 10, further comprising:
a seal configured to seal the first set of incoupler gratings and the second set of incoupler gratings in an interior of the stacked waveguide.

15. The wearable display of claim 10, wherein the first waveguide is configured to provide light having wavelengths associated with a first color to an eye of a user.

16. The wearable display of claim 15, wherein the second waveguide is configured to provide light having wavelengths associated with a second color and a third color to the eye of the user.

17. The wearable display of claim 16, wherein the second color includes blue and the third color includes green.

18. The wearable display of claim 17, wherein the first color includes red.

19. The wearable display of claim 10, further comprising:
an arm configured to include the optical engine and at least a portion of the stacked waveguide.

20. The wearable display of claim 10, further comprising:
an optical combiner including the stacked waveguide and a lens.

* * * * *